Aug. 29, 1967  D. J. GOODMAN  3,338,558
WIRE AND ROPE TRAPS
Filed Aug. 8, 1966  4 Sheets-Sheet 4
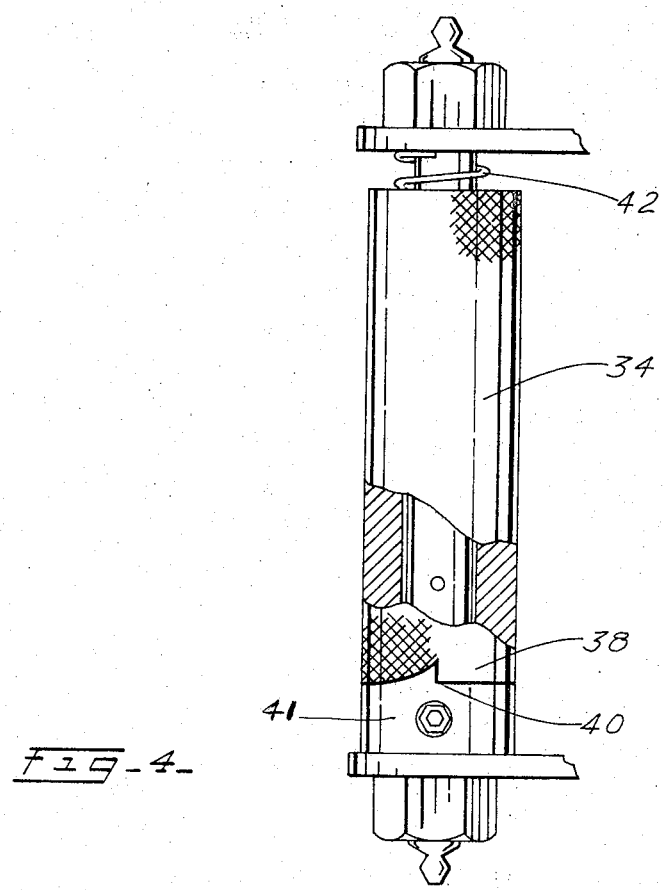
Fig-4-
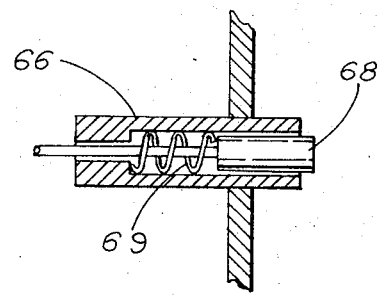
Fig-5-
INVENTOR.
Daniel J. Goodman
BY
ATTORNEY United States Patent Office 3,338,558
Patented Aug. 29, 1967

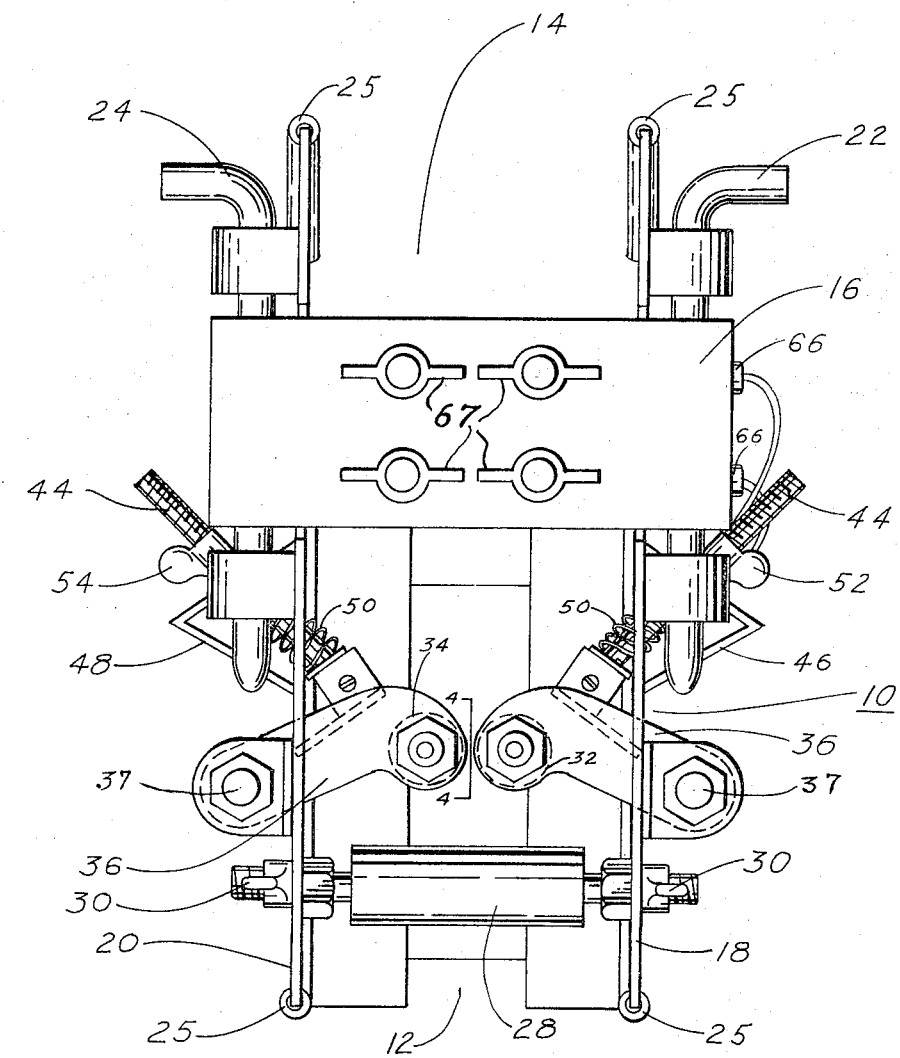

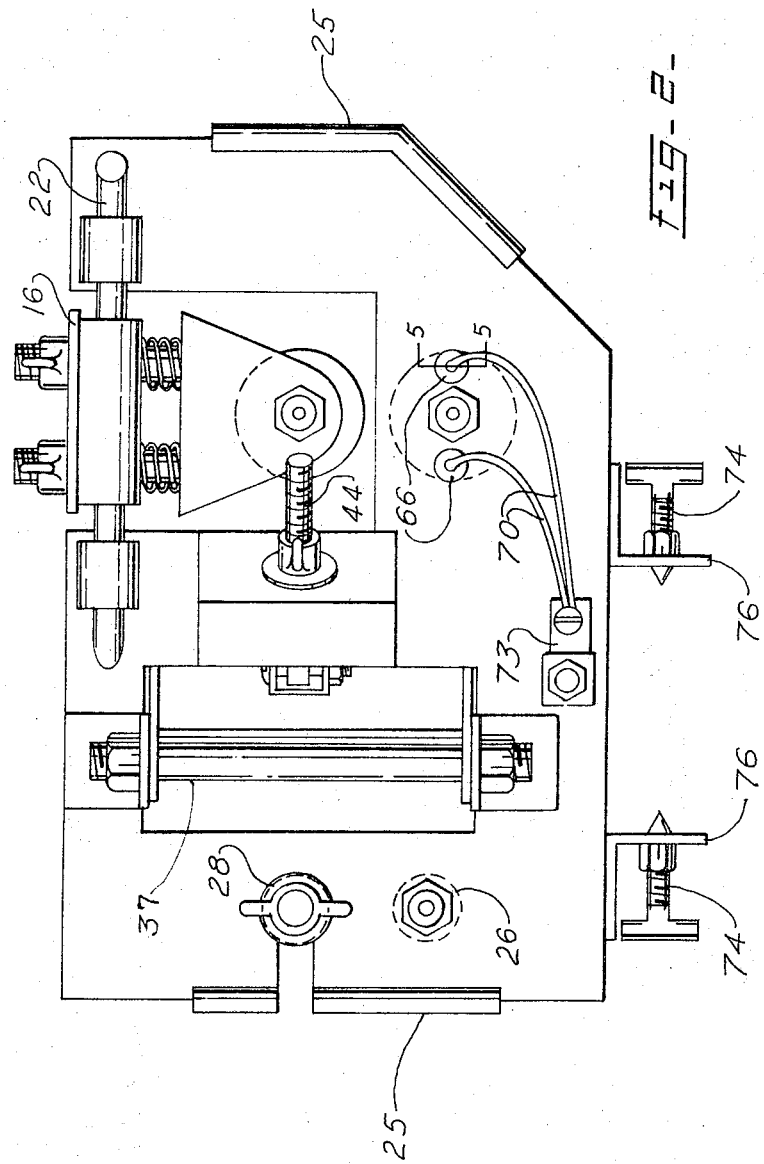

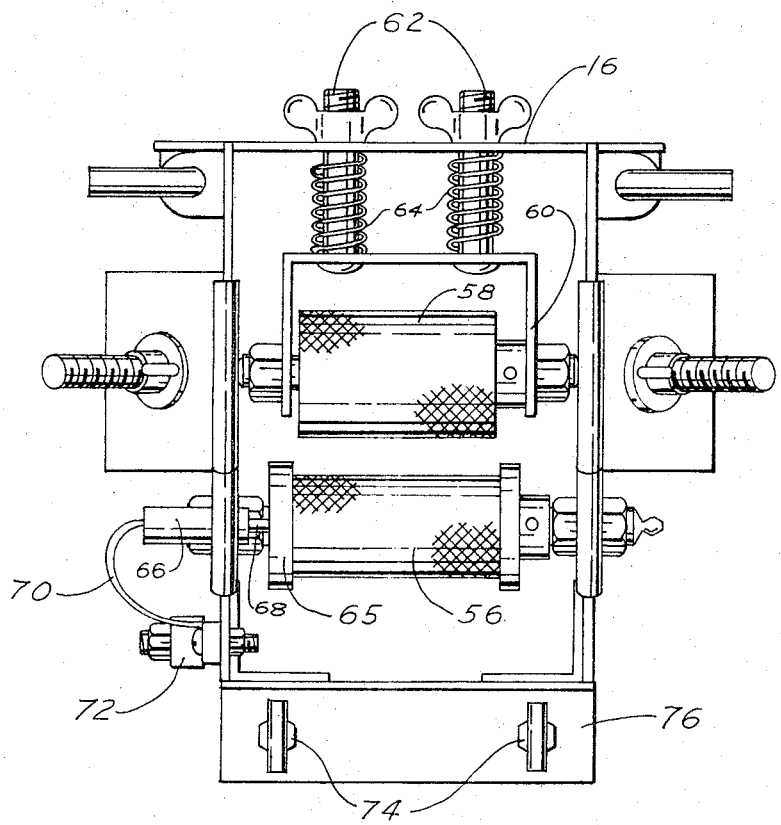
Fig-3-

3,338,558
WIRE AND ROPE TRAPS
Daniel J. Goodman, Rte. 4, Box 170,
Lake Charles, La. 70601
Filed Aug. 8, 1966, Ser. No. 570,821
13 Claims. (Cl. 254—190)

ABSTRACT OF THE DISCLOSURE

A stringing device for cables and such having rollers therein which permit the cable to travel in only one direction, the device being electrically grounded and having an opening cover for releasing the cable from the device. The uni-directionality of the device is achieved by utilizing mating rollers between which the cable passes that are capable of rotation in only one direction and by mounting the rollers so that they tend to further compress together when the cable attempts to backup. Direct or positive grounding is accomplished by directly grounding a set of rollers having knurled surfaces. The device is particularly useful in stringing cables between support poles.

The invention relates in general to an improved wire and rope trap and more particularly to an improved cable stringing device with positive grounding.

The invention will be described with respect to stringing electrical cable on supports or poles but its use is not limited to this purpose.

In stringing cable a reel is mounted for rotation behind a first cable support. The free end of the cable is attached to a stringing truck which proceeds down the line of supports stopping at just past each support for the stringing crew to lift the cable on the support where it must be left free to slide in the line of stringing until the entire cable is pulled in place on the supports. The supported cable may extend for a mile or more and its weight and freedom to slide causes the cable to sag between supports sometimes to the ground or to within the reach of persons on the ground. These sagging lengths can interfere with traffic on any road that may be crossed. In addition, if the cable is pulled through any magnetic field, a strong electric charge may be induced in the cable that can be dangerous to anyone or thing coming in contact with it.

It is an object of the invention to provide an improved stringing device that will permit a cable to pass freely through it in the stringing direction but not in the reverse direction.

Another object of the invention is to provide means for positively grounding the moving cable without interfering with the stringing.

Other objects and a fuller understanding of the invention may be had by referring to the following description and claims taken together with the accompanying drawings, in which:

FIGURE 1 is a plan view of the invention,
FIGURE 2 is a side view of the invention,
FIGURE 3 is a rear view of the invention,
FIGURE 4 is a sectional view taken along section line 4—4 of FIGURE 1, and
FIGURE 5 is a sectional view taken along section line 5—5 of FIGURE 2.

Referring to FIGURES 1, 2 and 3, the invention comprises a metal trough 10, open at both the front and rear ends 12 and 14 respectively, and partially closed at the top adjacent the rear end by a cover 16 which is mounted thereon with pivot pins 22 and 24 removably secured to the respective sides 18 and 20 of the trough 10. The cover is openable from either of said sides for removing a cable from the invention without cutting by removing one of the pivot pins and swinging the cover open around the other. Rounded fairing 25 is mounted on the front and rear ends of the trough sides to prevent abrading the cable when the direction of stringing is changed.

A first pair of rollers 26 and 28 respectively are mounted horizontally and spaced apart vertically in the trough adjacent the fornt end 12. The rollers are mounted for rotation and spaced apart a distance large enough to permit the largest cable to be strung to pass therebetween. The rollers 26 and 28 are smooth surfaced and serve as roller guides for cable fed into the the trough from above or below. The upper roller guide 28 is secured in place by thumb screws 30 and is removable to release the wire below it without cutting.

A second pair of rollers 32 and 34 are mounted vertically for rotation in the trough behind the first pair. The second pair are mounted on arms 36 that are pivoted by pivots 37 to the respective sides of the trough 10 and extend rearwardly a distance that will jam the rollers 32 and 34 in the center of the trough before the arms can be pivoted normal to the trough sides. The vertical rollers 32 and 34 are oppositely notched with notches 38 defined in their lower ends that fit into opposed notches 40 that are defined on collars 41 rigid with the respective arms 36. The notches 38 and 40 are shaped (see FIG. 4) to allow inward rotation of the respective vertical rollers as viewed from the front end of the trough but not outward or reverse rotation. Springs 42 mounted intermediate the top of the rollers and their respective arms 36 keep the notches engaged in attempted reverse rotation and allow them to ride over each other in inward rotation.

Threaded control rods 44 are pivoted to the respective arms 36 and pass through respective side abutments 46 and 48. Springs 50 are respectively mounted on the control rods 44 intermediate the side abutments and the arms 36 and tend to force the arms toward the front of the trough to bring the vertical rollers together for engaging a cable passing between them. Thumb nuts 52 and 54 on the respective control rods and engaging the respective side abutments adjustably limit the closure of the vertical rollers to prevent jamming and crushing a cable therebetween if the cable should reverse its course. The cylindrical surfaces of rollers 32 and 34 are roughened with a file-like finish to provide a non-slip grip on a cable passing between them.

A third pair of rollers 56 and 58 are mounted for rotation horizontally in the trough 10 adjacent the rear end thereof. The lower roller 56 is mounted on the sides of the trough and the upper roller 58 is mounted in a bracket 60 depending from the cover 16 on bolts 62. Springs 64 mounted respectively on bolts 62 intermediate the bracket 60 and the cover tend to force the upper roller into contact with the lower and any cable therebetween. Adjustable thumb nuts 67 engaging the upper ends of bolts 62 limit the closing distance between rollers but not the opening. The cylindrical surfaces of longitudinal rollers 56 and 58 are roughened and have a coarse file-like surface for cleaning oxide and dirt from the cable surfaces and to make a good electrical contact therebetween. A ring 65 is provided in one side of the lower roller 56 with a smooth end surface. Stationary bushings 66 are mounted in the opposed trough side and brushes 68 are slidably mounted in the bushings to pressure engage by spring 69 the rotating smooth end of the ring. Electrical cables 70 run from the brushes to a ground connection 72 on the trough side and there connected with the ground cable provided every support.

In operation the invention is oriented on the support with its entrance facing the direction from which the cable is being strung and bolted to said support by thumb bolts 74 in securing brackets 76. The end of the cable is passed between the three pairs of rollers which freely rotate to facilitate its passage through the trough 10. Any tendency for the cable to reverse its direction and pass back through the block causes the vertical rollers to pivot as closed as the manually adjustable control rods permits. The control rods are preset to limit closure of the vertical rollers to slightly less than the working diameter of the cable being strung. Since the vertical roller cannot reverse the direction of their rotation because of the cooperating notches 38 and 40 and have roughened surfaces, the cable is held without slipping and without being deformed by the vertical rollers being permitted unlimited range of closure dependent on the reverse pull on the cable. The positive grounding action of the brush contact in cooperation with the cleaning action of the rear horizontal rollers needs no further explanation.

The invention has been described with a certain degree of particularity but it should be understood that the present disclosure has been made only by way of example and that the numerous changes in details of construction and the combination and arrangement of parts may be resorted to without departing from the spirit and the scope of the invention as hereinafter claimed.

What is claimed is:

1. An improved device for stringing cable on supports comprising in combination: a trough, open at both ends, for pulling the end of a cable therethrough and having a top cover for retaining said cable in said trough, said cover being adapted to be opened for releasing said cable from the trough without cutting said cable; and dual-purpose means, pivotally mounted in said trough intermediate said open ends, for permitting the cable to be freely pulled through said trough in one direction and preventing said cable from backing in the opposite direction, whereby the sag between supports of a cable being strung can be controlled; said dual-purpose means comprising in combination: arms oppositely mounted in said trough, each said arm having oppositely disposed ends, one said end being pivoted to said trough and the other free end extending angularly inward and in the direction said cable is to be strung, said oppositely mounted arms being sufficiently long to meet in said trough before pivoting normal thereto; rollers mounted by mounting means for rotation parallel to each other on the respective free ends of said arms for engaging said cable therebetween; a rod pivotally secured to each of said arms and extending in the direction of cable stringing and outwardly through the respective adjacent sides of said trough; and spring means mounted on each said rod intermediate said respective arms and the adjacent sides for biasing said rollers toward each other to engage said cable whereby said rollers are resiliently free to swing outwardly as said cable passes therebetween from front to rear of said trough, but a reversal or direction in said cable pivots the free end mounted rollers inward and together to lock the cable from moving in said reverse direction.

2. Dual-purpose means as described in claim 1 wherein said rollers mounted by mounting means are knurled for non-slip cable gripping, and said mounting means comprises means for said rollers to only rotate oppositely and inwardly with respect to each other as viewed in the direction of cable stringing.

3. Mounting means as described in claim 2 wherein means for said rollers to only rotate oppositely and inwardly comprise in combination: a collar fixed on each of said arms between one end of each said roller and its associated arm, said collar defining notches adjacent said roller and the near end of said roller defining similarly opposite notches, said notches being shaped and adapted to ride over each other in said inward rotation and to lock in reverse rotation; and springs mounted intermediate the other ends of each said roller and its respective arm for biasing said rollers and collars together.

4. Dual-purpose means as described in claim 1 wherein said rods pivotally secured to each of said arms and extending through the respective trough sides are threaded and thumb nuts having reciprocal threads screwed thereon, whereby the inward pivoting of said arms are limited by rotating said thumb nuts in proportion to said rotation and the outward pivoting is unhindered.

5. An improved device for stringing cable on supports comprising in combination: an open ended trough having an openable cover for pulling a cable therethrough and releasing said cable without cutting; guide means mounted in said trough and adjacent said ends for guiding said cable into and out of said open ended trough when said cable is led in and out at an angle to said trough; roller means pivotally mounted for rotation in said trough intermediate said guide means and adapted to permit said cable to be freely pulled between said rollers in the direction of stringing and not in the reverse direction; and means for positively grounding said cable in cooperation with said guide means adjacent the trough end through which said cable is led out of.

6. An improved device for stringing cable as described in claim 5 wherein said guide means comprises in combination: two horizontal rollers mounted for rotation and vertically spaced apart a distance in excess of the largest working diameter cable to be strung, the upper roller of said vertically spaced apart rollers being removably mounted for releasing said cable without cutting; and two horizontal rollers mounted for rotation in vertical relationship, the lower roller being mounted in the sides of said trough and the upper roller being mounted adjustable vertically on said openable cover and adapted to resiliently engage said lower roller, both said rollers being knurled to clean oxide and dirt from said cable and make good electrical connection therewith.

7. An improved device for stringing cable on supports as described in claim 5 wherein said roller means comprises in combination: a pair of parallel rollers vertically mounted on oppositely pivoted arms, said arms adapted to respectively pivot to open said trough to passage of said cable when pulled in the stringing direction and to pivot to lock said cable when said cable reverses its directional of travel.

8. An improved device for stringing cable on supports as described in claim 5 wherein as grounding means comprises in combination: a ring fixed to said guide means and rotatable therewith; bushings mounted in said trough adjacent said ring; brushes slidably mounted in said bushings and adapted to contact said ring in rotary motion; springs mounted in said bushings and adapted to bias said brushes into continuous contact with said ring; and electrical conductors connecting said brushes to a grounded ground lug.

9. An improved device for stringing cable comprising in combination: a series of roller sets for guiding the cable, trough frame means for mounting said rollers in alignment, said series of rollers sets being mounted on said trough, and unidirectional means for permitting the cable to be freely pulled through said trough in one direction and preventing the cable from backing in the opposite direction, said unidirectional means comprising a pair of mating rollers and mounting means for permitting said pair of mating rollers to rotate in only one direction, said mounting means mounting said pair of mated rollers on said trough.

10. The improved device of claim 9 wherein said mounting means comprises arms oppositely mounted in said trough, each said arm having oppositely disposed ends, one said end being pivotally mounted on said trough and the other end being free to move relative to said trough and extending angularly inward in the direction the cable is free to move, said pair of mated rollers being mounted for rotation at the free ends of said arms, said arms being resiliently but strongly biased away from the sides of said trough and toward the center of said trough; whereby the pair of mated rollers press against the cable as it passes between the mated rollers and whereby said mated rollers are resiliently free to swing outwardly as the cable passes therebetween in the proper direction but a reversal of the direction pivots the mated rollers inwardly and together to assist in blocking the cable from moving in the reverse direction.

11. The improved device of claim 10 wherein said pair of mated rollers are knurled for non-slip cable gripping and have notched portions at at least one of their ends, and wherein said mounting means further include a collar fixed on each of said arms in mating relationship with said notched portion, said notches being shaped to permit relative motion in one direction but not in the opposite direction, the notched portion and said collar being resiliently biased toward each other.

12. The improved device of claim 9 wherein said trough includes openable cover means for permitting a cable to be inserted or removed from the trough whole and completely intact.

13. The improved device of claim 9 wherein one of said sets of rollers, at least one of which rollers has a working surface of electrically conductive material, is knurled to clean oxide and dirt from the cable passing therebetween and resiliently biased toward each other to make good electrical contact with the cable, at least one of said rollers having a ring portion, and wherein said trough includes a brushing mounted thereon and resiliently in contact with said ring portion and electrical conductors electrically connected to said brushing for grounding the cable.

References Cited

UNITED STATES PATENTS

| | | | |
|---|---|---|---|
| 2,821,947 | 2/1958 | Knauf | 226—151 |
| 3,098,638 | 7/1963 | McAuley | 254—198 |

EVON C. BLUNK, *Primary Examiner.*

H. C. HORNSBY, *Assistant Examiner.*